(12) United States Patent
Kodama et al.

(10) Patent No.: US 8,786,982 B1
(45) Date of Patent: Jul. 22, 2014

(54) DISK DRIVE DEVICE

(71) Applicant: Samsung Electro-Mechanics Japan Advanced Technology Co., Ltd., Fujieda (JP)

(72) Inventors: Mitsuo Kodama, Fujieda (JP); Kazuhiro Matsuo, Fujieda (JP)

(73) Assignee: Samsung Electro-Mechanics Japan Advanced Technology Co., Ltd., Fujieda, Shizuoka Prefecture (JP)

( * ) Notice: Subject to any disclaimer, the term of this patent is extended or adjusted under 35 U.S.C. 154(b) by 0 days.

(21) Appl. No.: 13/910,948

(22) Filed: Jun. 5, 2013

(30) Foreign Application Priority Data

Apr. 5, 2013 (JP) .................................. 2013-079087

(51) Int. Cl.
*G11B 17/02* (2006.01)
*F16C 32/06* (2006.01)
*H02K 7/08* (2006.01)

(52) U.S. Cl.
USPC ........................... 360/99.08; 310/90; 384/107

(58) Field of Classification Search
USPC .......... 360/99.08; 310/90; 384/100, 407, 115, 384/130, 132
See application file for complete search history.

(56) References Cited

U.S. PATENT DOCUMENTS

| | | | |
|---|---|---|---|
| 5,533,811 A | 7/1996 | Polch et al. | |
| 7,365,939 B2 * | 4/2008 | Gomyo et al. | 360/99.08 |
| 7,372,663 B2 * | 5/2008 | Leblanc et al. | 360/99.08 |
| 7,982,349 B2 | 7/2011 | Popov et al. | |
| 8,277,125 B2 | 10/2012 | Kimura et al. | |
| 8,308,365 B2 * | 11/2012 | Aiello et al. | 384/107 |
| 8,337,086 B2 | 12/2012 | Oe et al. | |
| 8,379,345 B2 * | 2/2013 | Mizukami et al. | 360/99.08 |
| 8,542,459 B2 * | 9/2013 | Mizukami et al. | 360/99.08 |
| 8,553,355 B2 * | 10/2013 | Mizukami et al. | 360/99.08 |
| 8,562,218 B2 * | 10/2013 | Kull | 384/107 |
| 8,619,388 B2 * | 12/2013 | Karis et al. | 360/99.08 |
| 8,675,304 B2 * | 3/2014 | Tamaoka et al. | 360/99.08 |
| 2012/0092792 A1 | 4/2012 | Sugi et al. | |
| 2012/0113546 A1 | 5/2012 | Sugi et al. | |
| 2013/0003223 A1 | 1/2013 | Kimura et al. | |
| 2013/0077190 A1 | 3/2013 | Kimura et al. | |
| 2013/0322793 A1 * | 12/2013 | Kodama et al. | 384/112 |

FOREIGN PATENT DOCUMENTS

| | | |
|---|---|---|
| JP | 2012-089199 A | 5/2012 |
| JP | 2012-104169 A | 5/2012 |

\* cited by examiner

*Primary Examiner* — Angel Castro
(74) *Attorney, Agent, or Firm* — Holtz Holtz Goodman & Chick PC

(57) ABSTRACT

A disk drive device includes a rotating body that rotates and drives a disk, a stationary body which includes a chassis with a protrusive part and a stator core fastened with the chassis, and a fluid bearing unit. The chassis has a recess with a bottom provided in the protrusive part, and the fluid bearing unit includes an insertion part inserted in the recess with the bottom, and a core encircled part. A gas passage is provided which causes a clearance space between the insertion part and the recess with the bottom to be in communication with a disk retaining space.

20 Claims, 4 Drawing Sheets

DISK DRIVE DEVICE

BACKGROUND OF THE INVENTION

1. Field of the Invention

The present invention relates to a disk drive device.

2. Description of the Related Art

Disk drive devices like a hard disk drive that is a kind of a rotating device employ a structure in which a disk retaining space defined by a chassis and a top cover and for retaining a recording disk is filled with clean gas. According to such disk drive devices, a bearing mechanism is fastened to a through-hole provided in the chassis in some cases, and in this case, there is a concern about, for example, a leak-out of the clean gas and a leak-in of unclean gas from a space of the joined portion between the through-hole and the bearing mechanism.

Hence, JP 2012-089199 A and JP 2012-104169 A disclose a disk drive device that has the bearing mechanism fastened to a recess with a bottom formed in the chassis in order to suppress a leak-out of the clean gas and a leak-in of unclean gas.

According to such a disk drive device, after predetermined components are assembled with the chassis, gases present in the disk retaining space is discharged, and a filling gas having different composition and cleanness from those of the already-present gas is filled in the disk retaining space. An example already-present gas is air, while an example filling gas is a gas having a relatively small molecular weight, such as helium or a hydrogen gas.

However, the already-present gas in a substantially closed space like a space between the recess with a bottom of the chassis and the bearing mechanism in the axial direction is discharged through a tiny gap of the joined portion between the recess with the bottom and the bearing mechanism. Accordingly, it takes a long time to sufficiently discharge the already-present gas. When the filling gas is charged without having the already-present gas in the substantially closed space to be sufficiently discharged, the remaining already-present gas leaks to the disk retaining space as time advances, contaminates the filling gas, thereby changing the characteristics of the filling gas. When the characteristics of the filling gas change, in the worst case, the floating level (gap) of the magnetic head relative to the recording disk changes, resulting in a malfunction of the disk drive device.

The present invention has been made in view of the above-explained disadvantages, and it is an object of the present invention to provide a disk drive device which suppresses a mixing of an already-present gas with a filling gas, and which is capable of suppressing an occurrence of a malfunction.

SUMMARY OF THE INVENTION

A first aspect of the present invention provides a disk drive device that includes: a rotating body on which a disk to be retained in a disk retaining space is to be mounted and which rotates and drives the disk; a stationary body that comprises a chassis which includes a protrusive part protruding toward the rotating body in an axial direction, and a stator core which includes an inner periphery fastened to the protrusive part; and a fluid bearing unit which supports the rotating body in a freely rotatable manner relative to the chassis, the chassis being provided with a recess with a bottom which is formed in an end face of the protrusive part and which is concaved in an opposite direction to the rotating body, the fluid bearing unit comprising an insertion part inserted in the recess with the bottom and joined with the recess, and a core encircled part encircled by the stator core, and a gas passage which causes a clearance space formed between the insertion part and the recess with the bottom to be in communication with the disk retaining space and which allows a gas to pass through being provided in at least one of the stationary body and the fluid bearing unit.

A second aspect of the present invention provides a disk drive device that includes: a rotating body on which a disk to be retained in a disk retaining space is to be mounted and which rotates and drives the disk; a stationary body that comprises a chassis which includes a protrusive part protruding toward the rotating body in an axial direction, and a stator core which includes an inner periphery fastened to the protrusive part; and a fluid bearing unit which supports the rotating body in a freely rotatable manner relative to the chassis, the chassis being provided with a recess with a bottom which is formed in an end face of the protrusive part and which is concaved in an opposite direction to the rotating body, the fluid bearing unit comprising an insertion part inserted in the recess with the bottom and joined with the recess, and a core bonded part encircled by the stator core and bonded therewith, and a gas passage which causes a clearance space formed between the insertion part and the recess with the bottom to be in communication with the disk retaining space and which allows a gas to pass through being provided in at least one of the stationary body and the fluid bearing unit.

A third aspect of the present invention provides a disk drive device that includes: a rotating body on which a disk to be retained in a disk retaining space is to be mounted and which rotates and drives the disk; a stationary body that comprises a chassis which includes a protrusive part protruding toward the rotating body in an axial direction, and a stator core which includes an inner periphery fastened to the protrusive part; and a fluid bearing unit which supports the rotating body in a freely rotatable manner relative to the chassis, the chassis being provided with a recess with a bottom which is formed in an end face of the protrusive part and which is concaved in an opposite direction to the rotating body, the fluid bearing unit comprising an insertion part inserted in the recess with the bottom and joined with the recess, and a core bonded part encircled by the stator core and bonded therewith, and a gas containing helium at a predetermined ratio being filled in the disk retaining space.

According to the present invention, by providing a passage where a gas can pass through, a replacement of an already-present gas with a filling gas is facilitated, thereby providing a disk drive device which suppresses a mixing of the already-present gas with the filling gas and which is capable of suppressing an occurrence of a malfunction.

DETAILED DESCRIPTION OF THE PREFERRED EMBODIMENTS

Figure 1:
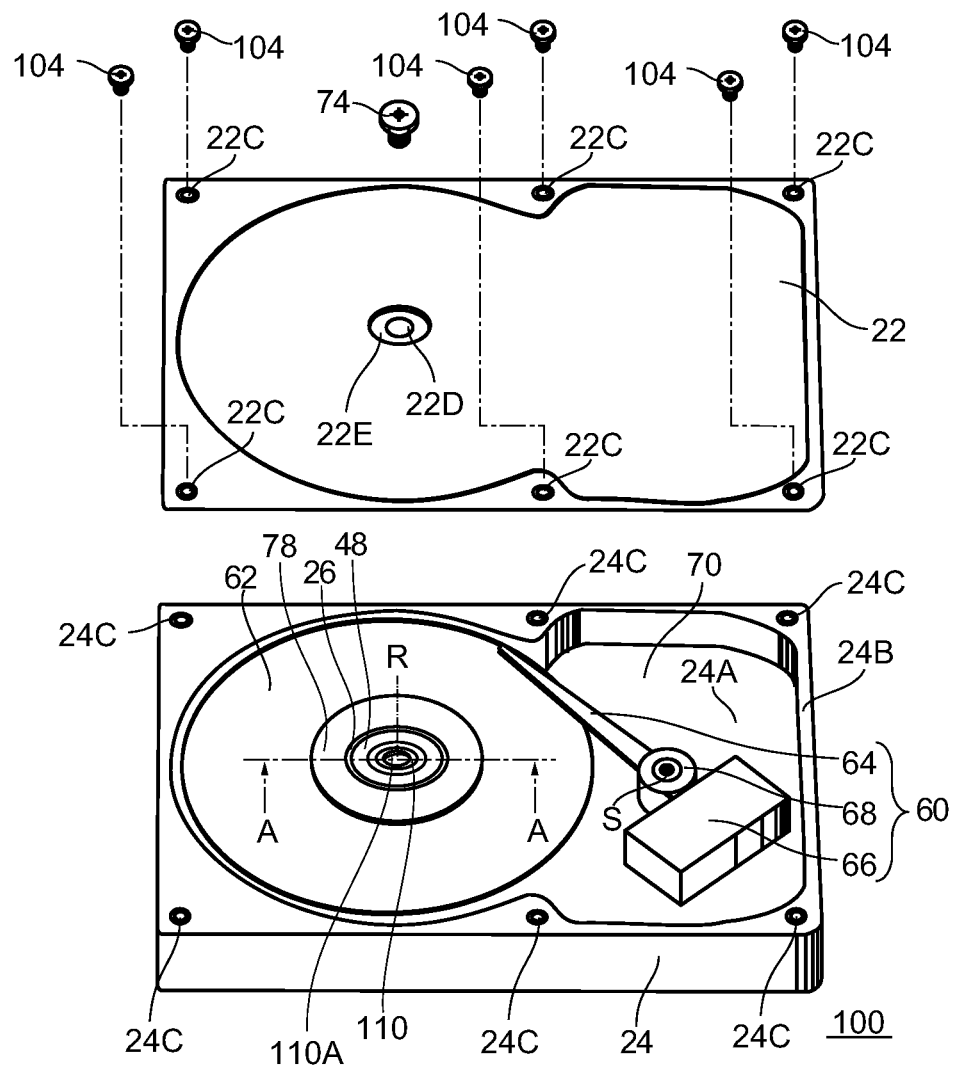
FIG. 1 is an exploded perspective view illustrating a disk drive device according to an embodiment of the present invention.

An explanation will be given of a preferred embodiment of the present invention with reference to the accompanying drawings. The same or similar structural element or member will be denoted by the same reference numeral throughout the respective figures, and the duplicated explanation will be omitted accordingly. The dimension of each member in the figure is enlarged or reduced as needed to facilitate understanding for the present invention. Some members not important to explain an embodiment of the present invention in the figure will be also omitted.

A disk drive device of an embodiment is suitably used as, for example, a disk drive device like a hard disk drive on which magnetic recording disks for magnetically recording data are to be mounted and which rotates and drives the magnetic recording disks. The disk drive device of this type includes, for example, a rotating body that is attached to a stationary body via bearing means in a freely rotatable manner. The rotating body includes, for example, mounting means for mounting a drive-target medium like a magnetic recording disk. The bearing means includes, for example, radial bearing means formed at either one of the stationary body and the rotating body. The bearing means also includes, for example, thrust bearing means formed at either one of the stationary body and the rotating body. The thrust bearing means is, for example, located outwardly of the radial bearing means in the radial direction. For example, the radial bearing means and the thrust bearing means may generate dynamic pressure to a lubrication medium. The radial bearing means and the thrust bearing means may contain, for example, a lubrication fluid. The disk drive device may include, for example, rotating-driving means for giving rotational torque to the rotating body. The rotating-driving means may be, for example, a brushless spindle motor. The rotating-driving means may also include, for example, a coil and a magnet.

Embodiment

FIG. 1 is a perspective view illustrating a disk drive device 100 according to an embodiment of the present invention. In order to facilitate understanding to the present invention, FIG. 1 illustrates a condition in which a top cover 22 is detached. Several components not important to explain the present invention are illustrated in an omitted manner in FIG. 1. The disk drive device 100 includes a chassis 24, a shaft 110, a hub 26, magnetic recording disks 62, a second annular body 48, a clamper 78, a data reader/writer 60, the top cover 22, a center screw 74, and for example, six peripheral screws 104.

In the following explanation, a side where the hub 26 is mounted relative to the chassis 24 is defined as an upper side. Moreover, a direction along a rotational axis R of a rotating body, an arbitrary direction traversing the rotational axis R on a plane orthogonal to the rotational axis R, and an arbitrary direction on such a plane are referred to as an axial direction, a radial direction, and a planar direction, respectively, in some cases. The indications of such directions are not to limit the posture of the disk drive device 100 when in use, and the disk drive device 100 can be used in any posture.

The magnetic recording disk 62 is, for example, a 2.5-inch magnetic recording disk having a diameter of 65 mm and formed of a glass, and a diameter of a center hole thereof is 20 mm. If the magnetic recording disk 62 is made thin, the rigidity thereof decreases, and is warped when polished at the time of the manufacturing of the disk drive device 100, thereby reducing the processing flatness. Conversely, if the magnetic recording disk 62 is made thick, the weight increases. Regarding the magnetic recording disk 62, it is proven if the thickness is within a range at least from 0.5 mm to 1.25 mm, the rigidity and the weight are practical. In this embodiment, the magnetic recording disk 62 has a thickness of from 0.7 mm to 0.9 mm, which suppresses a decrease of the processing flatness, thereby suppressing a reduction of the recording density. For example, three to five magnetic recording disks 62 are to be mounted on the hub 26, and are rotated together with the rotation of the hub 26. The magnetic recording disks 62 are fastened to the hub 26 by spacers 72 and the clamper 78.

The chassis 24 has a bottom plate 24A that forms the bottom of the disk drive device 100, and an outer periphery wall 24B that is formed along the outer periphery of the bottom plate 24A so as to surround the region where the magnetic recording disks 62 are mounted. For example, six screw holes 24C are formed in the upper face of the outer periphery wall 24B. Note that the chassis may be referred to as a base in some cases.

The data reader/writer 60 includes a recording/playing head (unillustrated), a swing arm 64, a voice coil motor 66, and a pivot assembly 68. The recoding/playing head is attached to the tip of the swing arm 64, records data in the magnetic recording disk 62, or reads the data therefrom. The pivot assembly 68 supports the swing arm 64 in a swingable manner to the chassis 24 around a head rotating shaft S. The voice coil motor 66 allows the swing arm 64 to swing around the head rotating shaft S to move the recording/playing head to a desired location over the top face of the magnetic recording disk 62. The voice coil motor 66 and the pivot assembly 68 are configured by a conventionally well-known technology of controlling the position of a head.

The top cover 22 is a thin plate formed in a substantially rectangular shape, and has, for example, six screw throughholes 22C provided at the periphery of the top cover 22, a cover recess 22E, and a center hole 22D provided at the center of the cover recess 22E. The cover recess 22E is formed around the rotation axis R. The top cover 22 is formed by, for example, pressing an aluminum plate or an iron-steel plate into a predetermined shape. A surface processing like plating may be applied on the top cover 22 in order to suppress corrosion. The top cover 22 is fixed to the upper face of the outer periphery wall 24B of the chassis 24 by, for example, the six peripheral screws 104. The six peripheral screws 104 correspond to the six screw through-holes 22C and the six screw holes 24C, respectively. In particular, the top cover 22 and the upper face of the outer periphery wall 24B are fixed with each other so as to suppress a leak into the interior of the disk drive device 100 from the joined portion of the top cover 22 and the upper face of the outer periphery wall 24B. The interior of the disk drive device 100 is, more specifically, a clean space 70 surrounded by the bottom plate 24A of the chassis 24, the outer periphery wall 24B of the chassis 24, and the top cover 22. This clean space 70 is designed so as to be fully sealed, i.e., so as not to have a leak-in from the exterior and a leak-out to the exterior. The clean space 70 is filled with clean air having particles eliminated. Hence, foreign materials like the particles are prevented from sticking to the magnetic recording disks 62, thereby improving the reliability of the operation of the disk drive device 100. The center screw 74 corresponds to a retainer hole 110A of the shaft 110. The top cover 22 is joined with the shaft 110 by letting the center screw 74 to pass all the way through the center hole 22D and screwing and engaging the center screw 74 into the retainer hole 110A.

Figure 2:
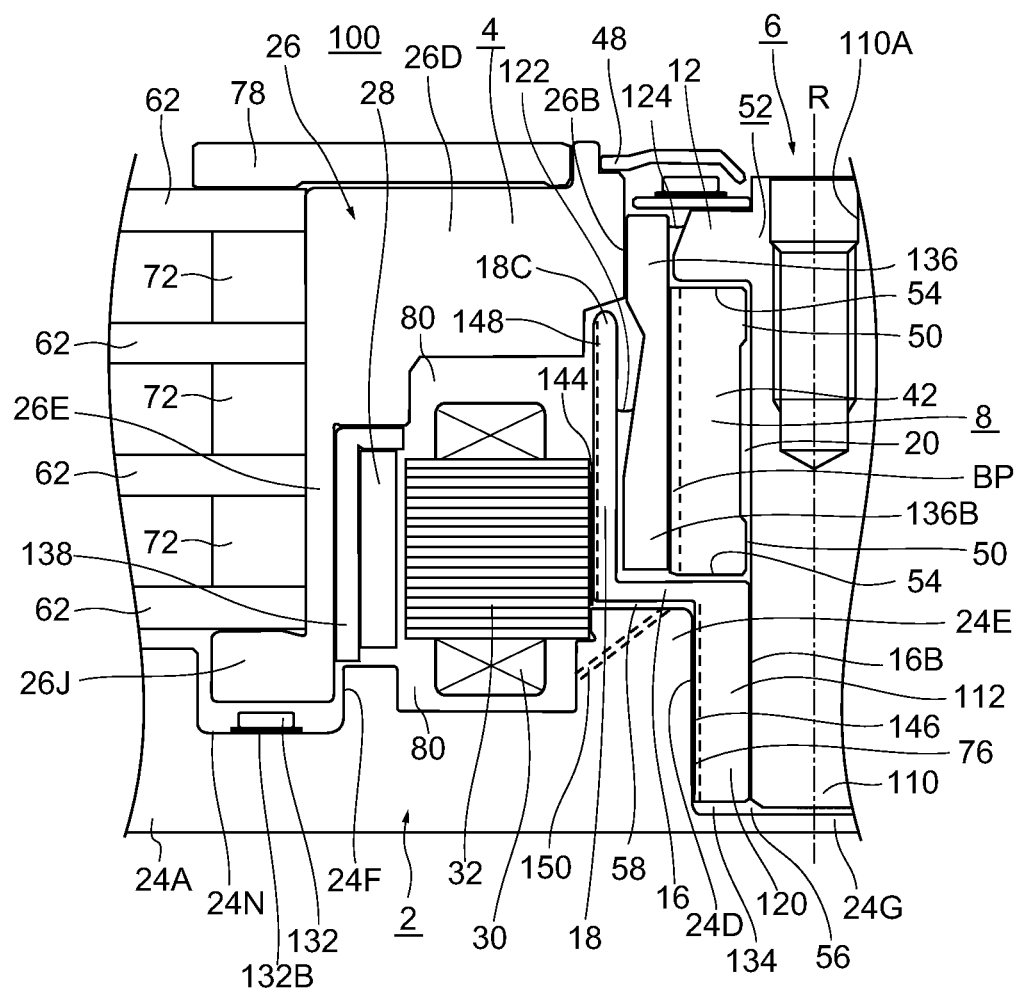
FIG. 2 is a cross-sectional view taken along a line A-A in FIG. 1.

Reference is now made to FIG. 2.

FIG. 2 is a cross-sectional view taken along a line A-A in FIG. 1, and mainly illustrates the left of the rotation axis R. A stationary body 2 includes a shaft body 6, a stator core 32, coils 30, and further filters 130 and 132. The shaft body 6 includes the shaft 110, a top flange 12 fastened to the shaft 110 near one end, and an outer wall member 112 fastened to the shaft 110 near another end. The outer wall member 112 includes a flange part 16, a flange encircling part 18, and a shaft ring 120.

The rotating body 4 includes the hub 26, a bearing body 8, the second annular body 48, a yoke 138, and a magnet 28.

The rotating body 4 and the stationary body 2 include, as a lubrication medium, a lubricant 20 present continuously in some gaps between the shaft body 6 and the bearing body 8. The bearing body 8 includes a sleeve 42 and an outer cylinder member 136. The sleeve 42 encircles the shaft 110 with a gap. The outer cylinder member 136 encircles the sleeve 42, fastens the sleeve 42, and is fastened to the hub 26.

Moreover, the shaft body 6, the bearing body 8, and the lubricant 20 configure a fluid bearing unit together with dynamic pressure generating grooves to be discussed later.

<Chassis>

A material for forming the chassis 24 and a technique for forming the chassis 24 are not limited to any particular ones. According to this embodiment, as an example, the chassis 24 is shaped by die-casting of aluminum alloy, and is formed integrally. The chassis 24 may be formed by, for example, pressing a metal plate like stainless steel or aluminum. In this case, the chassis 24 partially includes an embossed plane embossed through pressing. The chassis 24 may include, for example, a surface processing layer like nickel plating. Moreover, the chassis 24 may include, for example, a part formed of a resin. Furthermore, the chassis 24 may include a coating layer like an epoxy resin. The bottom plate 24A of the chassis 24 may be formed by laminating equal to or greater than two plates.

The chassis 24 includes a protrusive part 24E formed in a cylindrical shape as viewed from the top around the rotation axis R, and a bearing supporting part 134 provided at the center of the protrusive part 24E. The protrusive part 24E protrudes toward the hub 26 from the upper face of the bottom plate 24A. The stator core 32 is fastened to the outer periphery of the protrusive part 24E, and the upper face of the protrusive part 24E faces with the outer wall member 112 in an axial direction. The bearing supporting part 134 includes a cylindrical inner periphery wall 24D concaved downwardly at the center of the protrusive part 24E, and a bottom 24G provided at the lower end of the inner periphery wall 24D. The inner periphery wall 24D is formed in a cylindrical shape as viewed from the top around the rotation axis R, and the bottom 24G covers and blocks the lower end of the inner periphery wall 24D. That is, the bearing supporting part 134 forms a recess with a bottom concaved downwardly from the upper face of the protrusive part 24E. A part of the stationary portion of a fluid bearing unit 52 is fitted in and fastened to the inner periphery wall 24D of the bearing supporting part 134. The bottom 24G is formed together with the chassis 24 in a seamless manner. In this case, an excellent air-tightness can be accomplished. The bottom 24G may be first formed separately from the chassis 24, and then joined together therewith. In this case, the machining of the inner periphery wall 24D becomes easy.

Figure 3:
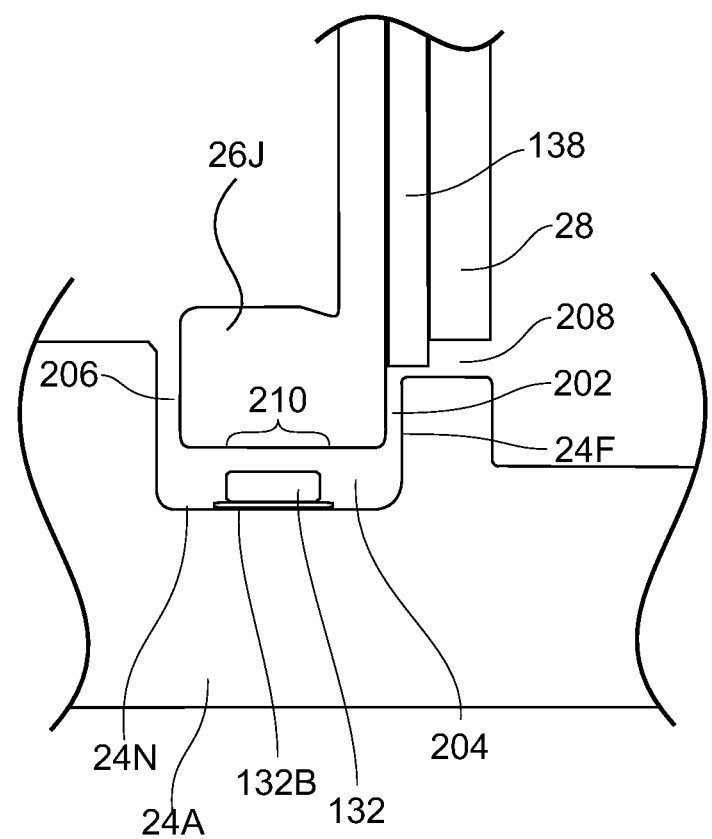
FIG. 3 is an enlarged cross-sectional view illustrating the periphery of a mount portion of a hub in FIG. 2 in an enlarged manner.

Reference is now made to FIG. 3.

FIG. 3 is an enlarged cross-sectional view illustrating the periphery of a mount portion 26J of the hub 26 of this embodiment in an enlarged manner.

A recess 24N in an annular shape as viewed from the top is provided in the bottom plate 24A of the chassis 24 around the rotation axis R. The recess 24N is provided at a location facing with the mount portion 26J of the hub 26 to be discussed later in the axial direction. The mount portion 26J of the hub 26 to be discussed later partially enters this recess 24N. The entering portion of the hub 26 is provided around the rotation axis R. In addition, according to this embodiment, an opposing wall 24F in an annular shape as viewed from the top is provided in the bottom plate 24A around the rotation axis R. The opposing wall 24F is provided at a location included in a projection area of the magnet 28 in the axial direction according to this embodiment. Moreover, according to this embodiment, the opposing wall 24F is provided at a location facing with a part of the inner periphery of the hub 26 in a radial direction, and is continuous from the recess 24N in a cross-sectional view.

A first clearance 202 between the opposing wall 24F and the inner periphery of the hub 26 is set to be, for example, from 0.05 mm to 0.3 mm. A lower end face of the mount portion 26J of the hub 26 faces with the upper face of the recess 24N of the chassis 24 in the axial direction to form a second clearance 204. The second clearance 204 runs in the radial direction, and is set to be, for example, from 0.02 mm to 0.5 mm. The outer periphery of the mount portion 26J of the hub 26 faces with the inner periphery of the recess 24N of the chassis 24 in the radial direction to form a third clearance 206. The third clearance 206 runs in the axial direction, and is set to be, for example, from 0.05 mm to 0.3 mm. The lower end face of the magnet 28 faces with, in the axial direction, a running face that runs from the upper end of the opposing wall 24F of the chassis 24 in the radial direction to form a fourth clearance 208. The fourth clearance 208 runs in the radial direction, and is set to be, for example, from 0.02 mm to 0.5 mm. In this embodiment, as an example, the first clearance 202, the second clearance 204, the third clearance 206, and the fourth clearance 208 are set to be from 0.1 mm to 0.2 mm, from 0.05 mm to 0.1 mm, from 0.1 mm to 0.2 mm, and from 0.1 mm to 0.3 mm, respectively.

The dimension of the first clearance 202 in the axial direction is larger than the dimension thereof in the radial direction, and is, for example, equal to or greater than five times than the dimension in the radial direction. The dimension of the second clearance 204 in the radial direction is larger than the dimension thereof in the axial direction, and is, for example, equal to or greater than five times than the dimension in the axial direction. The dimension of the third clearance 206 in the axial direction is larger than the dimension thereof in the radial direction, and is, for example, equal to or greater than five times than the dimension in the radial direction. The dimension of the third clearance 206 in the axial direction is larger than the dimension thereof in the radial direction, and is, for example, equal to or greater than five times than the dimension in the radial direction.

The hub 26 has a hub opposing face that faces with the chassis 24 at an area outwardly of the inner periphery of the magnet 28 in the radial direction, and the chassis 24 has a chassis opposing face that faces with the hub opposing face with a clearance, and a gas dynamic pressure generating groove that produces dynamic pressure in a pump-in direction to gas present in the clearance between the opposing faces when the hub 26 rotates relative to the chassis 24 can be provided at either one of the chassis opposing face and the hub opposing face. Since the gas dynamic pressure generating groove is provided in an area outwardly of the inner periphery of the magnet 28 in the radial direction, the gas present in this area can be effectively pushed in toward the internal space.

As an example, a radial gas dynamic pressure generating groove that pushes the gas present in the first clearance 202 toward the magnet 28 upon rotation of the hub 26 may be provided in either one of the opposing faces in the radial direction forming the first clearance 202. As another example, a thrust gas dynamic pressure generating groove that pushes the gas present in the second clearance 204 toward the first clearance 202 upon rotation of the hub 26 may be provided in either one of the opposing faces in the axial direction forming the second clearance 204. As the other example, another radial gas dynamic pressure generating groove that pushes the gas present in the third clearance 206 toward the second clearance 204 upon rotation of the hub 26 may be provided in either one of the opposing faces in the radial direction forming the third clearance 206. Regarding such gas dynamic pressure generating grooves, a gas dynamic pressure generating groove in solo or multiple gas dynamic pressure generating grooves may be provided. The gas dynamic pressure generating groove can be formed in, for example, a spiral shape or a herringbone shape.

According to this embodiment, a gas dynamic pressure generating groove 210 in a spiral shape is formed in an area which is the lower end face of the mount portion 26J of the hub 26 and which faces with the upper face of the recess 24N of the chassis 24 in the axial direction. In this case, it becomes possible to suppress a diffusion of the gasified lubricant 20 around the magnetic recording disks 62.

Regarding the dynamic pressure generating groove 210, for example, a technique of directly forming such a groove in the lower end of the mount portion 26J or a technique of fastening a separate member having the dynamic pressure generating groove 210 formed in advance to the lower end of the mount portion 26J is applicable. Such a separate member can be formed by, for example, pressing a metal material, or performing die-forming on a resin material. The dynamic pressure generating groove 210 can be also formed by pressing, ball rolling, electro chemical machining or cutting, etc. Moreover, the dynamic pressure generating groove can be provided in respective opposing faces forming the second clearance 204 and the third clearance 206 through the same technique.

<Stator Core>

Returning to FIG. 2, the stator core 32 includes an annular part and for example, 12 salient poles that run outwardly in the radial direction from the annular part. The stator core 32 is formed by, for example, laminating five to 30 electromagnetic steel sheets each having a thickness of 0.2 to 0.35 mm, and integrating those sheets by caulking. In this embodiment, as an example, 18 electromagnetic steel sheets each having a thickness of 0.2 mm are laminated together. A skin layer is provided on the surface of the stator core 32. An insulative painting, such as electro-deposition painting or powder coating, is applied to the surface of the stator core 32, i.e., the skin layer.

The stator core 32 has the lower end of the inner periphery of the annular part fitted to the tier provided on the protrusive part 24E and seated thereto, and has the inner periphery of the annular part joined with the tier of the protrusive part 24E by press-fitting, bonding or a combination thereof. Moreover, the inner periphery of the annular part of the stator core 32 is bonded and fastened to the outer periphery of the flange encircling part 18 that is a larger-diameter part of the outer wall member 112 by a bond 144. According to such a structure, multiple portions of the annular part of the stator core 32 in the axial direction are supported in a fixed manner, and thus a vibration of the stator core 32 can be suppressed in comparison with a case in which only a portion of the annular part is fastened. According to this embodiment, as viewed in the axial direction, an area of 50 to 90% of the inner periphery of the annular part of the stator core 32 is included in a joined area supported in a fixed manner. In this case, a vibration of the stator core 32 can be further suppressed.

<Coils>

The coils 30 are each formed by winding a conductor wire around each salient pole of the stator core 32 by a predetermined number of turns. The coils 30 produce field magnetic fields along the respective salient poles when a drive current is caused to flow through the respective coils 30. The conductor wire is formed by, for example, coating the surface of the core wire like soft copper with an insulative layer like an urethane resin. A lubricating substance is applied to the surface of the conductor wire to reduce a frictional resistance. An example lubricating substance is a polyamide compound.

<Outer Cylinder Member>

The outer cylinder member 136 is fastened to an opening 26B of the hub 26 provided at the center thereof in the axial direction by thermal inserting. The outer cylinder member 136 may be fastened to the hub 26 by other techniques like press-fitting. A bond may be applied to the joined portion between the outer cylinder member 136 and the hub 26 in order to improve the air-tightness. The outer cylinder member 136 encircles the sleeve 42, and is bonded to and fastened to the sleeve 42. The outer cylinder member 136 includes an extended portion 136B which extends toward the flange part 16, and which enters in the flange encircling part 18. The extended portion 136B faces with the flange encircling part 18 with a clearance in the radial direction, and faces with the outer wall member 112 in the axial direction.

<Hub>

The hub 26 is a member spreading outwardly in the radial direction, and includes a disk portion 26D in which the opening 26B passing all the way through in the axial direction is provided at the center, an annular portion 26E that extends downwardly in the axial direction from the outer periphery of the disk portion 26D, and the mount portion 26J that extends outwardly in the radial direction from the lower outer periphery of the annular portion 26E. The respective center holes of the magnetic recording disks 62 in the disk shape are engaged with the annular portion 26E of the hub 26, and the magnetic recording disk 62 is mounted on the mount portion 26J. The mount portion 26J at least partially enters the recess 24N provided in the bottom plate 24A of the chassis 24. The clearance among the recess 24N, the mount portion 26J, and the opposing wall 24F forms a labyrinth.

The opening 26B, the disk portion 26D, the annular portion 26E, and the mount portion 26J are all formed coaxially and annularly around the rotation axis R. As a result, the hub 26 is in a substantially cup shape. The disk portion 26D, the annular portion 26E, and the mount portion 26J are formed together. The hub 26 is formed of, for example, a non-ferrous material like an aluminum alloy, a ferrous material like stainless steel, or a resin material like LCP (Liquid crystal Polymer), or a combination thereof. The hub 26 may be provided with a surface cover layer formed by coating, plating, etc. In this case, for example, it can suppress a peeling of the surface.

<Spacer>

The spacers 72 are provided in order to separate the magnetic recording disks 62 from each other. The spacers 72 are each in a hollow ring shape, and have the inner periphery engaged with the annular portion 26E. The spacers 72 are held between the lowermost magnetic recording disk 62 and the uppermost magnetic recording disk 62. Moreover, in order to prevent the uppermost magnetic recording disk 62 from being detached from the hub 26, the clamper 78 is provided. The clamper 78 is in a hollow disk shape, and for example, is fastened to the upper face of the hub 26 by a fastener (unillustrated) like a screw. Hence, the clamper 78 holds the uppermost magnetic recording disk 62 so as to prevent this magnetic recording disk 62 from being detached from the hub 26.

<Yoke>

The yoke 138 is in a cylindrical shape around the rotation axis R, and includes a hollow cylindrical part and an extended part extending inwardly of the radial direction from the upper end of the cylindrical part. The yoke 138 is formed by, for example, pressing or cutting a ferrous material having a soft magnetism. A skin layer by plating or coating may be provided on the surface of the yoke 138. The yoke 138 has the inner periphery of the cylindrical part bonded and fastened with the magnet 28. The upper end of the magnet 28 abuts the lower end of the extended part. The yoke 138 has the outer periphery of the cylindrical part bonded and fastened with the inner periphery of the annular portion 26E of the hub 26. The extended part of the yoke 138 abuts the lower face of the hub 26.

<Magnet>

The magnet 28 is in a hollow ring shape, and has the outer periphery fastened to the inner periphery of the yoke 138 by, for example, bonding. The magnet 28 is formed of, for example, a ferrite-based magnetic material or a rare-earth-based magnetic material. An example binder contained is a resin like polyamide. The magnet 28 may be formed by laminating a ferrite-based magnetic layer and a rare-earth-based magnetic layer together. The surface of the magnet 28 has a skin layer formed by, for example, electrodeposition painting or spray painting. By providing the skin layer, an oxidization of the magnet 28 can be prevented, or a peeling of the surface of the magnet 28 can be prevented. The magnet 28 has, for example, eight or 16 magnetic poles on the inner periphery in the circumferential direction, and has the inner periphery facing with the outer peripheries of the salient poles of the stator core 32 with a gap in the radial direction. The height dimension of the magnet 28, i.e., the thickness thereof may be larger than the thickness of the stator core 32.

<Fluid Bearing Unit>

Furthermore, the shaft body 6, the bearing body 8, and the lubricant 20 form the fluid bearing unit 52. The fluid bearing unit 52 has an air-liquid interface between the lubricant 20 and the ambient air in a clearance between the shaft body 6 and the bearing body 8. In this embodiment, a second air-liquid interface 122 to be discussed later which is an air-liquid interface at the chassis side is exposed in an area held between the chassis 24 and the hub 26. This fluid bearing unit also has a first air-liquid interface 124 to be discussed later which is an air-liquid interface at the hub side exposed in an area opened toward a side distant from the chassis 24 in the hub 26 in the axial direction.

<Shaft Body>

An explanation will now be given of the structure of the shaft body 6 in detail. The shaft body 6 includes the outer wall member 112, the shaft 110, and the top flange 12.

<Outer Wall Member>

The outer wall member 112 includes the flange part 16, the flange encircling part 18, and the shaft ring 120. The flange encircling part 18 protrudes from the outer periphery of the flange part 16 toward the hub 26. The shaft ring 120 protrudes downwardly from the inner periphery of the flange part 16 toward the chassis 24. A shaft insertion hole 16B is formed coaxially with the rotation axis R in the center of the flange part 16 and that of the shaft ring 120. The outer wall member 112 has, for example, the flange part 16, the flange encircling part 18, and the shaft ring 120 formed together. In this case, it becomes possible to decrease the manufacturing errors of the outer wall member 112 and the shaft ring 120, and a labor work for joining those can be eliminated. Alternatively, a deformation of the outer wall member 112 with respect to a shock and a load can be suppressed.

In another aspect, the outer wall member 112 forms an outer wall of the stationary portion of the fluid bearing unit 52. The shaft ring 120 is a smaller-diameter part of the outer wall member 112, and the flange encircling part 18 is a larger-diameter part of the outer wall member 112. The outer wall member 112 is formed by, for example, cutting and machining a metal material like SUS430 or SUS303. Depending on the application of the disk drive device 100 and the restriction over designing thereof, etc., the outer wall member 112 may be formed of other materials like a resin and may be formed through other techniques like pressing or molding.

The flange encircling part 18 has an upper end 18C that enters a rotating-body recess which is formed in the lower face of the rotating body 4 and which is concaved upwardly in the axial direction. The rotating-body recess is formed by, for example, the inner periphery of the hub 26 and the outer periphery of the outer cylinder member 136. Clearances between the upper end 18C of the flange encircling part 18 and the rotating-body recess in the radial direction and in the axial direction form a labyrinth, thereby preventing the gasified lubricant 20 from the air-liquid interface 122 from spreading.

<Shaft>

The shaft 110 is a substantially cylindrical member which is located on the rotation axis R and which runs in the axial direction, and is formed by, for example, cutting and machining or grinding and machining of a ferrous material like SUS420J2, SUS430 or SUS303. The shaft 110 may be quenched in order to enhance the hardness. The shaft 110 may have an outer periphery and a lower face of the top flange 12 polished in order to improve the dimensional precision. The shaft 110 may be formed of other materials like a resin, and may be formed through other techniques like pressing or molding.

<Top Flange>

The top flange 12 is provided near one end of the shaft 110 distant from the chassis 24. The top flange 12 is disposed in the axial direction so as to cover the upper face of the sleeve 42 with a clearance, and faces the outer cylinder member 136 with a clearance in the radial direction. The top flange 12 has a tapered face which is formed at the outer periphery thereof and which has a distance from the rotation axis R in the radial direction that becomes larger as coming closer to the chassis 24.

The shaft 110 and the top flange 12 are formed together. In this case, the manufacturing errors of the shaft 110 and the top flange 12 can be reduced, and a labor work for joining those can be eliminated. Depending on the application and the restriction over designing, the top flange 12 may be formed as a separate piece from the shaft 110.

The shaft 110 has another end fitted in the shaft insertion hole 16B of the outer wall member 112, and fastened thereto by, for example, interference fitting. This interference fitting can be realized by, for example, press-fitting the shaft 110 into the shaft insertion hole 16B, thermal fitting, or cooling the shaft 110 by a liquid nitrogen and then fitting the shaft 110 in the shaft insertion hole 16B and letting the shaft 110 to return to a normal temperature. In this interference fitting, bonding may be additionally applied.

<Bearing Body>

Next, a detailed explanation will be given of a structure of the bearing body 8. The bearing body 8 includes the substantially cylindrical sleeve 42 that encircles the middle portion of the shaft 110, i.e., a portion between the top flange 12 and the flange part 16, and the substantially cylindrical outer cylinder member 136. The sleeve 42 is joined with the outer cylinder member 136, and the outer cylinder member 136 is joined with the hub 26. In other words, the sleeve 42 is fastened to the hub 26 through the outer cylinder member 136. The upper end of the sleeve 42 faces with the lower face of the top flange 12 via a gap in the axial direction, and the lower end of the sleeve 42 faces with the upper face of the flange part 16 via a gap in the axial direction. According to such a structure, the sleeve 42 is freely rotatable relative to the shaft 110, and thus the hub 26 joined with the sleeve 42 is supported in a freely rotatable manner relative to the chassis 24.

The bearing body 8 is formed by, for example, cutting and machining a metal material like SUS430. The bearing body 8 may have a skin layer formed by, for example, electroless nickel plating. The bearing body 8 may be formed of other materials like brass.

The sleeve 42 is hollow and in a substantially cylindrical shape, and has the inner periphery encircling the shaft 110 with a clearance. Provided in the clearance between the inner periphery of the sleeve 42 and the shaft 110 in the radial direction are a pair of radial dynamic pressure bearing portions distant from each other in the axial direction. Radial dynamic pressure generating grooves 50 that produce radial dynamic pressure are provided in areas of the inner periphery of the sleeve 42 corresponding to the radial dynamic pressure bearing portions. The radial dynamic pressure generating grooves 50 may be provided in the outer periphery of the shaft 110 instead of the sleeve 42. A lubricant reserving portion concaved outwardly in the radial direction is provided in a space between the radial dynamic pressure bearing portions in the inner periphery of the sleeve 42.

<Passage>

The sleeve 42 further includes a passage BP which is formed in the outer periphery of the sleeve 42, runs in the axial direction, and causes a space formed outwardly of the upper end of the sleeve 42 and a space formed outwardly of the lower end of the sleeve 42 in the axial direction to be in communication therewith. The passage BP includes a groove formed in the outer periphery of the sleeve 42 and running from the upper end thereof to the lower end thereof in the axial direction.

<Thrust Opposing Portion>

A thrust opposing portion is provided in a gap between the lower face of the top flange 12 and the upper face of the sleeve 42 facing with each other in the axial direction. A thrust dynamic pressure generating groove 54 is provided in an area of the sleeve 42 corresponding to the thrust opposing portion. The thrust dynamic pressure generating groove 54 may be provided in the lower face of the top flange 12 instead of the sleeve 42.

Conversely, another thrust opposing portion is provided in a gap between the upper face of the flange part 16 and the lower face of the sleeve 42. Another thrust dynamic pressure generating groove 54 is provided in an area of the sleeve 42 corresponding to another thrust opposing portion. Another thrust dynamic pressure generating groove 54 may be provided in the upper face of the flange part 16 instead of the sleeve 42.

<Dynamic Pressure Generating Groove>

The radial dynamic pressure generating groove 50 is formed in a herringbone shape as an example. Such a groove may be formed in other shapes like a spiral shape. The thrust dynamic pressure generating groove 54 is formed in a spiral shape as an example. Such a groove may be formed in other shapes like a herringbone shape. Those dynamic pressure generating grooves 50 and 54 are formed by, for example, pressing, ball rolling, electro chemical machining, or cutting and machining. Those dynamic pressure generating grooves 50 and 54 may be formed through different techniques.

<First Capillary Seal>

A tapered space that gradually becomes widespread toward the upper space in the axial direction is formed in a gap in the radial direction between the outer periphery of the top flange 12 and the inner periphery of the outer cylinder member 136, and a first air-liquid interface 124 of the lubricant 20 contacts such an outer periphery and such an inner periphery. Hence, a first capillary seal that suppresses a splashing of the lubricant 20 by capillary force is formed.

<Second Capillary Seal>

A tapered space that gradually becomes widespread toward the upper space in the axial direction is formed in a gap in the radial direction between the outer periphery of the extended portion 136B and the inner periphery of the flange encircling part 18, and a second air-liquid interface 122 of the lubricant 20 contacts such an outer periphery and such an inner periphery. Hence, a second capillary seal that suppresses a splashing of the lubricant 20 by capillary force is formed.

<Bearing Fastening Portion>

The outer periphery of the shaft ring 120 that is the smaller-diameter part of the outer wall member 112 is, for example, bonded to the inner periphery wall 24D of the bearing supporting part 134 by a bond 76, and thus the fluid bearing unit 52 is fastened to the chassis 24. Moreover, the fluid bearing unit 52 is also fastened by letting the outer periphery of the flange encircling part 18 that is a larger-diameter part of the outer wall member 112 to be bonded to the inner periphery of the annular part of the stator core 32 by a bond 144. Since the multiple portions of the fluid bearing unit 52 apart from each other in the axial direction or in the radial direction among the stationary portions are supported by the chassis 24 in a fixed manner, it becomes possible to suppress a deformation of such supporting portions when shock is applied thereto. The fluid bearing unit 52 has the outer cylinder member 136 that is a part of the rotating portion bonded and fastened to the opening 26B of the hub 26. As a result, the fluid bearing unit 52 supports the hub 26 in a freely rotatable manner relative to the chassis 24.

<Gas Passage>

Next, an explanation will be given of a structure of drawing gases already present in a substantially closed space. In this embodiment, example spaces substantially closed are a clearance space 56 where the fluid bearing unit 52 and the bearing supporting part 134 face with each other in the axial direction and a clearance space 58 where the protrusive part 24E and the fluid bearing unit 52 face with each other in the axial direction. In order to facilitate the drawing of the already-present gases in the clearance space 56 and the clearance space 58 to the disk retaining space 70, gas passages that enable gases to flow through between the respective spaces are provided. In this embodiment, a core retaining space 80 for retaining therein the stator core 32 is in communication with the disk retaining space 70 between the hub 26 and the chassis 24, and thus gas passages that cause the clearance space 56 and the clearance space 58 to be in communication with the core retaining space 80 are provided.

A gas passage 146 that is a recess formed in the outer periphery of the shaft ring 120 of the outer wall member 112 and running in the axial direction is formed. The gas passage 146 causes the clearance space 56 to be in communication with the clearance space 58. Already-present gas in the clearance space 56 can be drawn to the clearance space 58 through the gas passage 146. The gas passage 146 may be provided in the inner periphery wall 24D of the bearing supporting part 134.

In order to draw already-present gas in the clearance space 58 to the core retaining space 80, a gas passage that causes the clearance space 58 to be in communication with the core retaining space 80 may also be provided. Such a gas passage can be formed as a recess or an opening provided between the components or in such a component. In this embodiment, a gas passage 148 that is a recess formed in the flange encircling part 18 of the outer wall member 112 and running in the axial direction and a gas passage 150 provided in the protrusive part 24E are provided. The gas passage 150 is formed as a through-hole that passes all the way through the end face of the protrusive part 24E facing with the clearance space 58 and the side face of the protrusive part 24E facing with the core retaining space 80. The gas passage 148 and the gas passage 150 enable already-present gases in the clearance space 58 to be drawn to the core retaining space 80. By providing the gas passage 148 and the gas passage 150, already-present gases can be further easily drawn. Only either one of the gas passage 148 and the gas passage 150 may be provided, and in this case, a labor work for machining can be reduced.

<Trap 1>

With reference to FIG. 3, a trap for catching the dispersed component of the lubricant 20 may be provided in a space where the rotating body 4 faces with the stationary body 2. The trap catches mists and gaseous components dispersed from the area where the lubricant 20 is filled, thereby preventing such mists and gaseous components from being sticking to the magnetic recording disks 62. The trap is not limited to any particular one, but for example, a porous material or a charcoal filter can be used. As an example, a filter 132 containing an active charcoal can be provided in a space where the hub 26 and the chassis 24 face with each other in the axial direction. In this embodiment, the filter 132 is fastened to the recess 24N provided in the bottom plate 24A by, for example, bonding. In order to facilitate such a fastening, a double-sided tape 132B is present between the filter 132 and the recess 24N.

<Annular Member>

Figure 4:
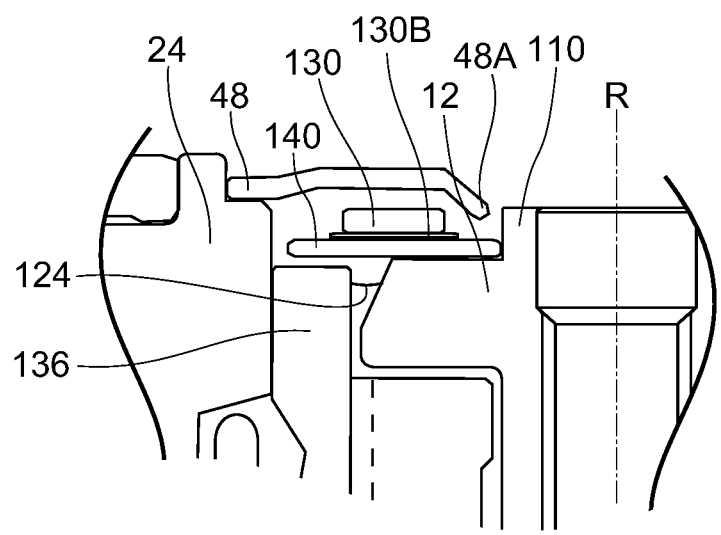
FIG. 4 is an enlarged cross-sectional view illustrating the periphery of a first air-liquid interface in FIG. 2 in an enlarged manner.

Reference is now made to FIG. 4.

FIG. 4 is an enlarged cross-sectional view illustrating the periphery of the first air-liquid interface 124 in an enlarged manner.

Multiple annular members which are provided in an overlapping manner in the axial direction of the rotating body 4 in a space that causes the first air-liquid interface 124 of the lubricant 20 to be in communication with the disk retaining space 70 and which cover a clearance between the rotating body 4 and the shaft body 6 are provided. Those annular members suppress a dispersion of the gasified lubricant 20 from the first air-liquid interface 124, thereby suppressing a spreading of such a gasified lubricant 20 to the disk retaining space 70. More specifically, a first annular member 140 is bonded and fastened to the upper end face of the top flange 12 so as to cover the first air-liquid interface 124. Moreover, a second annular member 48 is fastened to the rotating body 4 by, for example, bonding so as to cover the first annular member 140.

The first annular member 140 is in a hollow annular shape as viewed from the top, is in a substantially rectangular shape in a cross-sectional view, and has a dimension in the axial direction smaller than the dimension in the radial direction. The second annular member 48 is in a hollow annular shape as viewed from the top, and has a shape in such a way that the center area facing with the filter 130 in the axial direction and in a cross-sectional view is concaved upwardly over the outer circumferential end and the inner circumferential end. The second annular member 48 has an inner circumferential part 48A bent downwardly, and the inner circumferential part 48A has a part that faces the side face of the shaft 110 in the radial direction. The second annular member 48 further suppresses a dispersion of the lubricant 20 by letting the inner circumferential part 48A to enter a clearance between the filter 130 and the shaft 110 in the radial direction.

The first annular member 140 and the second annular member 48 are each formed by, for example, cutting and machining a stainless-steel material, such as SUS303 or SUS430. The first annular member 140 and the second annular member 48 may be formed of other metal materials or resin material, and may be formed through other techniques, such as pressing and molding.

<Trap 2>

The filter 130 which is another trap for catching the dispersed components of the lubricant 20 and which contains thereinside an active charcoal is provided in a space in the axial direction where the first annular member 140 and the second annular member 48 face with each other. This suppresses a dispersion of the gasified lubricant 20 from the first air-liquid interface 124 to the disk retaining space 70. In this embodiment, as an example, the filter 130 is fastened to the upper face of the first annular member 140 by, for example, bonding. In order to facilitate the fastening, a double-sided tape 130B is present between the filter 130 and the first annular member 140. The filter 130 may be provided on the second annular member 48.

<Lubricant>

Returning to FIG. 2, an explanation will now be given of the lubricant. The lubricant 20 of this embodiment is composed of a base oil to which a fluorescent material is added. Example fluorescent materials applicable are various fluorescent materials, such as nonorganic material and organic material. As an example, the lubricant 20 of this embodiment is added with fluorescein as the fluorescent material. Fluorescein emits, for example, visible light of green spectrum by a photoluminescence phenomenon when irradiated with ultraviolet rays with a shorter wavelength than visible light.

An example containing rate of the fluorescent material in the lubricant is equal to or greater than 0.001 mass %, and more preferably, equal to or greater than 0.01 mass %. When the containing rate of the fluorescent material in the lubricant increases, the costs of the lubricant also increases, and thus it is preferable that the containing rate of the fluorescent material should be equal to or less than 1 mass %.

Next, an explanation will be given of a region where the lubricant 20 is filled. The lubricant 20 is continuously present in clearances between the bearing body 8 and the shaft body 6 between the first air-liquid interface 124 and the second air-liquid interface 122. More specifically, the lubricant 20 is present in regions including the first capillary seal, the clearance between the top flange 12 and the sleeve 42, the clearance in the radial direction between the sleeve 42 and the shaft 110, the clearance between the sleeve 42 and the flange part 16, the clearance between the extended portion 136B and the flange part 16, and the second capillary seal. Moreover, the lubricant 20 is also continuously filled in a region including the passage BP between the first air-liquid interface 124 and the second air-liquid interface 122.

<Fluid Bearing Unit>

An explanation will be given of an operation of the fluid bearing unit 52. When the bearing unit 8 rotates relative to the shaft body 6, the radial dynamic pressure generating grooves 50 and the thrust dynamic pressure generating grooves 54 produce dynamic pressures to the lubricant 20. The rotating body 4 coupled with the bearing body 8 is supported in the radial direction and in the axial direction by such dynamic pressures in a non-contact manner with the stationary body 2 coupled with the shaft body 6.

<Manufacturing Method>

Next, an explanation will be given of an example method of manufacturing the disk drive device 100 of this embodiment.

First, the sleeve 42 is fastened to the outer cylinder member 136 by, for example, bonding. Next, the sleeve 42 is placed between the outer wall member 112 and the top flange 12, and the outer wall member 112 and the shaft 110 are joined together by a combination of press-fitting and bonding. The lubricant 20 is filled in lubricant filling regions between the shaft body 6 and the bearing body 8, and thus the fluid bearing unit 52 is finished.

The outer cylinder member 136 of the fluid bearing unit 52 is fastened to the opening 26B of the hub 26 by, for example, bonding. The second annular member 48, the yoke 138, and the magnet 28 are respectively fastened to the hub 26 by bonding.

The chassis 24 to which the stator core 32 with the wound coils 30 is fastened is prepared, and the fluid bearing unit 52 is fastened to the chassis 24 by bonding. Next, the magnetic recording disks 62, the clamper 78, and the spacers 72 are attached. Subsequently, the data reader/writer 60 and the top cover 22 are attached. Thereafter, the disk drive device 100 is finished through predetermined processes like an inspection. Note that the above-explained processes are merely examples, and the disk drive device 100 may be manufactured through different processes and different procedures.

Next, an explanation will be given of an operation of the disk drive device 100 structured as explained above. In order to rotate the magnetic recording disks 62, a drive current of three phases is supplied to the coils 30. When the drive current flows through the respective coils 30, field magnetic fluxes are produced along the respective salient poles of the stator core 32. A mutual effect of such field magnetic fluxes and the magnetic fluxes of the drive magnetic poles of the magnet 28 applies torque to the magnet 28, and thus the hub 26 and the magnetic recording disks 62 engaged therewith start rotating. While at the same time, the voice coil motor 66 swings the swing arm 64, and thus the recording/playing head comes and goes within the swinging range over the magnetic recording disk 62. The recording/playing head converts magnetic data recorded in the magnetic recording disk 62 into electric signals, and transmits the electric signals to a control substrate (unillustrated), or writes data transmitted from the control substrate in the form of electric signals on the magnetic recording disk 62 as magnetic data.

The disk drive device 100 of this embodiment employing the above-explained structure has following advantages.

According to the disk drive device 100, the dynamic pressure generating groove 210 is provided in the lower end face of the mount portion 26J of the hub 26 forming the second clearance 204. Hence, when the hub 26 rotates, gases present in the second clearance 204 are pushed back to the internal space of the hub 26, thereby preventing a gasified lubricant 20 from reaching the disk retaining space 70.

According to the disk drive device 100, the top flange 12 has a part formed together with the shaft 110. Accordingly, a possibility that the top flange 12 is detached from the shaft 110 is reduced, while at the same time, a reduction of the joining strength between the top flange 12 and the shaft 110 when the disk drive device 100 is in use can be prevented.

According to the disk drive device 100, the lubricant 20 contains the fluorescent material. Hence, by emitting light with a predetermined wavelength to the disk drive device 100, it becomes possible to easily detect the lubricant 20 adhered to an unintended portion during the manufacturing processes.

Moreover, when the lubricant 20 leaks out from a clearance between the components, it becomes easy to detect such a leakage.

According to the disk drive device 100, the gas passages 146, 148, and 150 are formed for the substantially closed spaces, i.e., the clearance space 56 and the clearance space 58. It becomes easy to draw already-present gases through those gas passages during the assembling of the disk drive device 100.

Moreover, although a drawing work is performed, already-present gases may remain in the core retaining space 80 depending on the condition (e.g., a process time) of the drawing work. The lubricant 20 gasified from the second air-liquid interface 122 may also remain in the core retaining space 80. Accordingly, when the gasified lubricant and the already present gases are mixed and reach the disk retaining space 70 from the core retaining space 80, the filling gas filled in the disk retaining space 70 is contaminated. According to the disk drive device 100, however, the trap 1 (filter 132) is provided in the space in communication with the disk retaining space 70, i.e., a space where the mount portion 26J of the hub 26 and the recess 24N of the chassis 24 face with each other. This trap 1 catches the mixture gas of the already-present gas and the gasified lubricant 20, thereby suppressing a contamination of the filling gas.

Furthermore, according to the disk drive device 100, the first annular member 140, the second annular member 48, and the trap 2 (filter 130) are provided in a space that causes the first air-liquid interface 124 of the lubricant 20 to be in communication with the disk retaining space 70. Since the inner circumferential part 48A of the second annular member 48 is bent downwardly, the lubricant 20 gasified from the first air-liquid interface 124 is prevented from escaping to the exterior through a space formed between the first annular member 140 and the second annular member 48. Moreover, the gaseous lubricant 20 remaining in such a space is surely caught by the trap 2. Hence, it becomes possible for the disk drive device 100 to suppress a contamination of the disk retaining space 70 by the gasified lubricant 20, and thus a contamination of the filling gas.

The structure and operation of the disk drive device according to the embodiment were explained above, but those are merely examples. A combination of the respective components can be further developed, and it should be understood by those skilled in the art that such developed structures are within the scope and spirit of the present invention.

In the above-explained embodiment, the explanation was given of the example case in which the rotating body 4 is joined with the bearing body 8, and the shaft body 6 is joined with the stationary body 2, but the present invention is not limited to this case. The rotating body 4 may be joined with the shaft body 6, and the bearing body 8 may be joined with the stationary body 2.

In the above-explained embodiment, the explanation was given of the example case in which the stator core is encircled by the magnet, but the present invention is not limited to this case. For example, the magnet may be encircled by the stator core.

In the above-explained embodiment, the explanation was given of the example case in which the one thrust dynamic pressure groove 54 is provided in the upper face of the sleeve 42, but the present invention is not limited to this case. A structure having no thrust dynamic pressure generating groove may be employed.

What is claimed is:

1. A disk drive device comprising:
a rotating body on which a disk to be retained in a disk retaining space is to be mounted and which rotates and drives the disk;
a stationary body that comprises a chassis which includes a protrusive part protruding toward the rotating body in an axial direction, and a stator core which includes an inner periphery fastened to the protrusive part; and
a fluid bearing unit which supports the rotating body in a freely rotatable manner relative to the chassis,
the chassis being provided with a recess with a bottom which is formed in an end face of the protrusive part and which is concaved in an opposite direction to the rotating body,
the fluid bearing unit comprising an insertion part inserted in the recess with the bottom and joined with the recess, and a core encircled part encircled by the stator core, and
a gas passage which causes a clearance space formed between the insertion part and the recess with the bottom to be in communication with the disk retaining space and which allows a gas to pass through being provided in at least one of the stationary body and the fluid bearing unit.

2. The disk drive device according to claim 1, wherein the gas passage comprises a first gas passage which is provided in the insertion part of the fluid bearing unit or in a part of the recess with the bottom where the insertion part is inserted, and which runs in the axial direction.

3. The disk drive device according to claim 1, wherein the gas passage comprises a second gas passage which is provided in the core encircled part of the fluid bearing unit or in a part of the stator core encircling the core encircled part and which runs in the axial direction.

4. The disk drive device according to claim 1, wherein the gas passage comprises a third gas passage which is provided in the protrusive part and which causes an end face of the protrusive part to be in communication with a side face of the protrusive part.

5. The disk drive device according to claim 1, wherein the stator core is bonded to the fluid bearing unit.

6. The disk drive device according to claim 5, wherein
the fluid bearing unit is a fluid bearing comprising a lubricant filled region where a lubricant is filled,
the lubricant filled region is encircled by an area where the stator core is bonded, and
a range of the area in the axial direction where the stator core is bonded includes a part overlapping a range of the lubricant filled region in the axial direction.

7. The disk drive device according to claim 1, wherein the fluid bearing unit comprises a bearing outer wall member which includes:
a first cylindrical part inserted in the recess with the bottom;
a flange part that protrudes outwardly of a radial direction from an end of the first cylindrical part; and
a second cylindrical part that protrudes in the axial direction toward the rotating body from an outward area of the flange part in the radial direction, and
the first cylindrical part, the flange part, and the second cylindrical part are formed together.

8. The disk drive device according to claim 1, wherein the recess with the bottom is formed by joining a bottom piece that is a separate piece from the chassis with an end of an opening provided in the chassis.

9. A disk drive device comprising:
a rotating body on which a disk to be retained in a disk retaining space is to be mounted and which rotates and drives the disk;
a stationary body that comprises a chassis which includes a protrusive part protruding toward the rotating body in an axial direction, and a stator core which includes an inner periphery fastened to the protrusive part; and
a fluid bearing unit which supports the rotating body in a freely rotatable manner relative to the chassis,
the chassis being provided with a recess with a bottom which is formed in an end face of the protrusive part and which is concaved in an opposite direction to the rotating body,
the fluid bearing unit comprising an insertion part inserted in the recess with the bottom and joined with the recess, and a core bonded part encircled by the stator core and bonded therewith, and
a gas passage which causes a clearance space formed between the insertion part and the recess with the bottom to be in communication with the disk retaining space and which allows a gas to pass through being provided in at least one of the stationary body and the fluid bearing unit.

10. The disk drive device according to claim 9, wherein the gas passage comprises a first gas passage which is provided in the insertion part of the fluid bearing unit or in a part of the recess with the bottom where the insertion part is inserted, and which runs in the axial direction.

11. The disk drive device according to claim 9, wherein the gas passage comprises a second gas passage which is provided in the core bonded part of the fluid bearing unit or in a part of the stator core encircling the core bonded part and which runs in the axial direction.

12. The disk drive device according to claim 9, wherein the gas passage comprises a third gas passage which is provided in the protrusive part and which causes an end face of the protrusive part to be in communication with a side face of the protrusive part.

13. The disk drive device according to claim 9, wherein
the fluid bearing unit is a fluid bearing comprising a lubricant filled region where a lubricant is filled,
the lubricant filled region is encircled by the core bonded part, and
the range of the core bonded part in the axial direction includes a part overlapping the range of the lubricant filled region in the axial direction.

14. The disk drive device according to claim 9, wherein the fluid bearing unit comprises a bearing outer wall member which includes:
a first cylindrical part inserted in the recess with the bottom;
a flange part that protrudes outwardly of a radial direction from an end of the first cylindrical part; and
a second cylindrical part that protrudes in the axial direction toward the rotating body from an outward area of the flange part in the radial direction, and
the first cylindrical part, the flange part, and the second cylindrical part are formed together.

15. The disk drive device according to claim 9, wherein the recess with the bottom is formed by joining a bottom piece that is a separate piece from the chassis with an end of an opening provided in the chassis.

16. A disk drive device comprising:
a rotating body on which a disk to be retained in a disk retaining space is to be mounted and which rotates and drives the disk;

a stationary body that comprises a chassis which includes a protrusive part protruding toward the rotating body in an axial direction, and a stator core which includes an inner periphery fastened to the protrusive part; and a fluid bearing unit which supports the rotating body in a freely rotatable manner relative to the chassis, the chassis being provided with a recess with a bottom which is formed in an end face of the protrusive part and which is concaved in an opposite direction to the rotating body, the fluid bearing unit comprising an insertion part inserted in the recess with the bottom and joined with the recess, and a core bonded part encircled by the stator core and bonded therewith, and a gas containing helium at a predetermined ratio being filled in the disk retaining space.

17. The disk drive device according to claim 16, wherein the fluid bearing unit is a fluid bearing comprising a lubricant filled region where a lubricant is filled, the lubricant filled region is encircled by the core bonded part, and a range of the core bonded part in the axial direction includes a part overlapping a range of the lubricant filled region in the axial direction.

18. The disk drive device according to claim 16, wherein the fluid bearing unit comprises a bearing outer wall member which includes:

a first cylindrical part inserted in the recess with the bottom;

a flange part that protrudes outwardly of a radial direction from an end of the first cylindrical part; and a second cylindrical part that protrudes in the axial direction toward the rotating body from an outward area of the flange part in the radial direction, and the first cylindrical part, the flange part, and the second cylindrical part are formed together.

19. The disk drive device according to claim 16, wherein the recess with the bottom is formed by joining a bottom piece that is a separate piece from the chassis with an end of an opening provided in the chassis.

20. The disk drive device according to claim 16, wherein a gas passage which causes a clearance space formed between the insertion part and the recess with the bottom to be in communication with the disk retaining space and which allows a gas to pass through is provided in at least one of the stationary body and the fluid bearing unit.

* * * * *